March 26, 1935. W. H. REICHARD 1,995,652
POWER SUPPLY SYSTEM
Filed Aug. 17, 1933
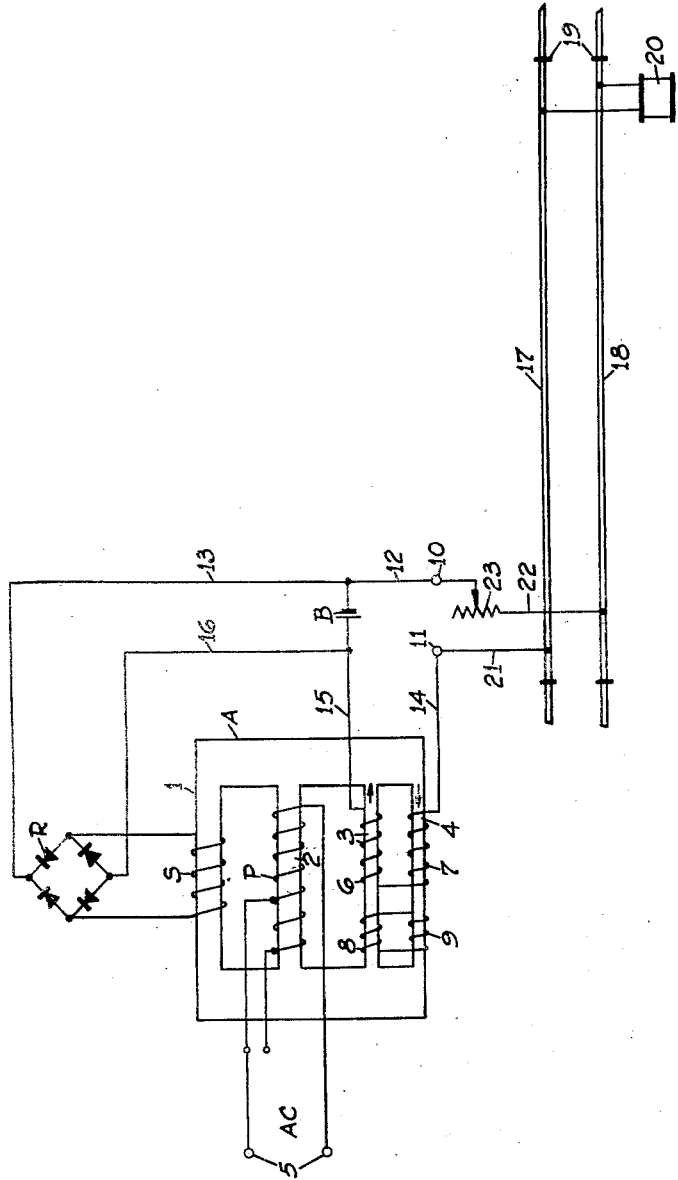

Patented Mar. 26, 1935

1,995,652

UNITED STATES PATENT OFFICE 1,995,652

POWER SUPPLY SYSTEM

Wade H. Reichard, Rochester, N. Y., assignor to General Railway Signal Company, Rochester, N. Y.

Application August 17, 1933, Serial No. 685,613

13 Claims. (Cl. 246—41)

This invention relates to power supply systems, and more particularly to an organization of a transformer and rectifier for supplying direct current from an alternating current source to track circuits and the like having variable loads, in connection with which it may be desirable to use a battery as a reserve supply, and in which it is disadvantageous to have any alternating current in the circuit supplied with direct current.

Considering the invention in its particular application to track circuits for railway signaling, in order to have proper performance of a track relay, it is desirable, for reasons commonly known in the art, to maintain the voltage across the track rails as the ballast leakage changes in wet and dry weather. With the ordinary arrangement of a transformer and rectifier for supplying direct current to track circuits, an adjustment is made to supply a certain amount of rectified alternating current to the track circuit as a compromise for average ballast conditions; and a change in the ballast resistance is accompanied by a variation in the voltage applied to the track circuit on account of the voltage drop through the rectifier and regulation of the transformer, with the result that any substantial variation in the ballast resistances, in wet and dry weather, for example, causes the voltage at the track relay to change from its desired value.

For these and other reasons, it has been the practice to use a battery to supply current to the track circuit in addition to the transformer and rectifier, not only to provide a reserve supply to maintain energization of the track circuit in case of failure of the alternating current supply, but also to maintain the voltage to the track circuit as ballast conditions change. In this arrangement, the battery supplies more or less of the track circuit current; and if a storage battery is used, a compromise adjustment of the transformer voltage has to be made which will keep the battery charged. In case of the primary battery, which has certain advantages from the standpoint of reserve supply, the adjustment of the transformer voltage has a further limitation in that it is undesirable and injurious to the battery to impress upon it for any substantial period of time, a voltage sufficient to establish a reverse current through the battery.

In connection with many track circuits, especially where the track circuit is used in "non-control" territory on a railroad equipped with train control or cab signal systems of the continuous inductive control type, it is desirable that there should be no alternating current supplied from the transformer and rectifier organization to the track circuit, since this alternating current in the track rails may cause improper operation of the train control or cab signal equipment.

In view of these and other considerations, one object of this invention is to provide a transformer which will automatically vary its secondary voltage applied to the rectifier, within limits, in response to changes in the ballast resistance and the amount of current supplied to the track circuit, so as to maintain the rectified alternating current voltage across the track rails necessary for proper energization of the track relay, and likewise reduce the supply of current from the battery used as a reserve source to substantially nothing, or such small currents as may be desirable to keep the battery in operating condition, such automatic regulation being further accomplished without producing any alternating current in the output circuit connected to the track rails.

More specifically, the invention relates to a transformer used in connection with a rectifier to supply direct current to a circuit of variable load, in which the change in the load current automatically increases and decreases, within limits, the secondary voltage of the transformer, thereby obtaining from the rectifier a substantially constant voltage for a certain range of current variation in the load circuit. In the preferred form of the invention, this automatic regulation is accomplished by varying the permeability of a magnetic shunt for the magnetic circuit between the primary and secondary coils of the transformer, in accordance with changes in the load current, so that more or less of the primary flux acts upon the secondary coil, said magnetic shunt and the control windings thereon being so arranged that no alternating current is produced in the load circuit.

Other objects, characteristic features, and advantages of the invention will be in part apparent as the description progresses, and in part discussed hereinafter.

The accompanying drawing shows diagrammatically, one specific form of the invention, as applied to track circuits for railway signaling systems.

Referring to the drawing the transformer embodying this invention comprises a laminated core A, formed with four parallel core portions 1, 2, 3, and 4, which have relative dimensions or cross sections selected in accordance with the principles hereinafter explained. On core portion 2 is the primary P of the transformer, preferably provided with taps as indicated and connected to the terminals 5 from a suitable source of alternating current. The adjacent core portion 1 carries the secondary coil S of the transformer, which is connected to a full-wave rectifier R, shown conventionally, which is of the usual well-known construction, preferably of the dry-plate or copper-oxide type.

The automatic regulation of the secondary voltage desired is obtained through the action of control windings 6 and 7 on the two parallel core portions 3 and 4. These control windings 6 and 7 comprise the same number of turns, and are so wound and connected in series as to send flux through the core portions 3 and 4 in opposite directions, as indicated by the arrows; or, in other words, to act cumulatively to send flux around in a local magnetic circuit including said core portions and the parts of the core joining their ends.

These control windings 6 and 7 are included in the output circuit of the rectifier R. Thus, if 10 and 11 are the output terminals for the device, one terminal 10 is connected by wires 12 and 13 to one output terminal of the rectifier R, and the other terminal 11 is connected by wire 14 to one of the control windings 7, the other control winding 6 being connected by wires 15 and 16 to the other output terminal of the rectifier R.

The dimensions of the core portions of the transformer core A, the number of turns in the windings and the like are, of course, designed and proportioned to fit the applied alternating current voltage and the load characteristics. It will be evident that the alternating flux provided by current in the primary P has a magnetic circuit through the secondary core portion 1, and other magnetic circuits through the control core portions 3 and 4. In other words, the main primary flux divides, part passing through the secondary coil S, and part through the core portions 3 and 4 carrying the control windings 6 and 7. The portion of the primary flux in the cores 3 and 4, which may be conveniently considered as leakage flux, depends upon the magnetic reluctance of these cores in comparison with the reluctance through the secondary core 1. Stated another way, the core portions 3 and 4 each form a magnetic shunt for the magnetic circuit coupling the primary winding P and the secondary winding S. The reluctance of each of the core portions 3 and 4 depends upon the permeability; and in turn the permeability depends upon the flux density. The direct current in the output circuit of the transformer flows through the control windings 3 and 4, which tend to send uni-directional flux in specified directions through the core portions 3 and 4. This direct flux together with alternating flux supplied from the primary P, produces a certain flux density in these core portions 3 and 4, and thereby determines their permeability, and their magnetic reluctance.

Assuming a certain load current, there is a corresponding excitation of the control coils 6 and 7, a corresponding ratio of the secondary flux and leakage flux, and a corresponding secondary voltage. Suppose now that the resistance of the load circuit changes to increase the current; and it is desirable to increase the secondary voltage to compensate for the resistance drop through the rectifier and the reduction in secondary voltage that would otherwise occur due to transformer regulation. In accordance with this invention, such an increase in load current increases the excitation of the control windings 6 and 7, and thereby the flux density in the leakage core portions 3 and 4, which in turn reduces the permeability and increases the reluctance, so that more of the primary flux passes through the secondary coil S and raises its voltage.

Conversely, if the resistance of the load circuit changes to decrease the current, less direct current flows in the control windings 6 and 7, thereby reducing the flux density in the leakage core portions 3 and 4, which in turn varies the permeability to lower the reluctance, with the result that more of the primary flux passes through the leakage paths through the core portions 3 and 4, and less flux through the secondary coil S, to decrease the secondary voltage.

The alternating flux from the primary in the core portions 3 and 4 tends to induce voltage in the control windings 6 and 7; but the parts are so proportioned that the alternating voltages of these windings 6 and 7 are equal and opposite so that no alternating current flows in the output circuit. To accomplish this result, the core portions 3 and 4 are of the same cross section to have the same reluctance, and the control windings 6 and 7 have the same number of turns. In order to take care of variations that may exist with ordinary manufacturing processes, balancing coils 8 and 9 are preferably employed to keep the alternating flux in the core portions 3 and 4 balanced and equal. These balancing coils 8 and 9 are in a closed circuit and are so wound and connected that the voltages induced therein by alternating flux in the core portions 3 and 4 oppose each other. If the relative reluctances in the core portions 3 and 4 should be such that more of the primary alternating flux tends to flow through the core portion 3, then the voltage induced in the balancing coil 8 would be greater than that in the other coil 9, and current would flow through the coil 9 and increase the alternating flux in the core portion 4 to match that in the core portion 3. If desired, these balancing coils, illustrated as separate coils 8 and 9, may be formed by connecting a suitable portion of the end turns of the two control coils or windings 6 and 7.

A transformer and rectifier organization, provided with automatic regulation in accordance with this invention may be used very advantageously to supply direct current to track circuits used in railway signaling systems, with or without a battery as a reserve supply. The drawing illustrates such an application of the invention with a battery B as a reserve supply connected across the wires 13 and 16, or the output terminals of the rectifier R, with the polarity of the battery opposing that of the rectifier. The typical track circuit illustrated comprises the track rails 17 and 18, bonded together in the usual way, with insulated joints 19 defining the limits of the track circuit. The track relay 20 of any one of the well-known types is connected across the track rails 17 and 18 at one end; and the output terminals 10 and 11 of the transformer and rectifier organization of this invention are connected to the track rails by wires 21 and 22, an adjustable resistance 23 being shown in the track feed lead 22, in accordance with common practice.

It is found that the parts may be designed and proportioned and the number of turns in the primary coil P selected by connecting to the proper tap, so that as the ballast leakage of the track circuit increases or decreases in wet or dry weather, or for any other reason, the voltage of the secondary coil S will vary correspondingly, and cause the rectifier to supply substantially all of the track circuit current. Under these conditions the battery B is called upon to supply such small currents that a primary battery may be used for the reserve supply, and its useful life be increased. If a storage battery is used for the battery B, the automatic regulation feature of this invention assures that this storage battery will be fully charged at all times. In the case of a primary battery, the battery is kept in better condition if it normally supplies a small amount of current, and with the type of primary battery commonly used, it is injuriously affected by sustained reverse voltages tending to send charging current through it. These, and other conditions, may be satisfied by the automatic regulating or compounding feature of this invention.

In order to obtain proper shunting of a track relay, it is evident that there should be a limit to the increase of rail potential upon increase of the current supplied to the track rail, so that when a car or train is passing the relatively great reduction in resistance across the track rails provided by the wheel shunt, it will not increase the voltage of the secondary coil S, and the inter-rail potential to an extent to energize the track relay, sufficiently to keep its armature attracted. If anything, the inter-rail voltage should drop in the presence of a car or train. This result is accomplished in accordance with this invention by properly selecting the cross section of the leakage core portions 3 and 4, in relation to the number of turns on the control windings 6 and 7, and the output current for an unoccupied track circuit, so that under the worst ballast resistance of the lowest conditions, these core portions 3 and 4 are substantially saturated and the maximum voltage of the secondary coil S is obtained. Under these conditions, when the track circuit is shunted, there is no automatic regulation to increase the voltage of the secondary coil S, and the increased current produces the desired reduction in inter-rail voltage, due to the resistance drop through the rectifier, the limiting resistance 23, and the normal regulation of the transformer.

Having thus shown and described one embodiment of my invention in considerable detail and having shown it applied to one particular field of use, it is desired to be understood that the invention may be applied to other uses, as for instance to aid a primary battery in the operation of switch machines or signals in such a manner that a rectifier furnishes substantially all of the necessary current while alternating current is available. It is also to be understood that the present invention may take other forms than the one illustrated, without departing from the scope thereof, and that the form illustrated has been selected to facilitate disclosure of the underlying principles thereof and without the thought of limiting my invention to the particular form illustrated in the drawing, all without departing from the spirit or scope of the invention, except as demanded by the scope of the appended claims.

What I claim as new is:—

1. In a power supply system for track circuits on railroads, a transformer having a primary and a secondary coil, a full wave rectifier connected to said secondary coil and in turn supplying current to the track circuit, and means associated with and acting on the magnetic circuit coupling said primary and said secondary coils for automatically increasing the secondary voltage as the current supplied to the track circuit increases.

2. In a power supply system for track circuits on railroads, a transformer having a primary and a secondary coil, said transformer having a core portion constituting a shunt for the magnetic circuit coupling said primary and said secondary coils, a rectifier connected to said secondary coil and supplying current to a track circuit, and means associated with said core portion and responsive to variations in the current supplied to the track circuit for automatically increasing the secondary voltage as the current to the track circuit increases.

3. In a signaling system for railroads, the combination with the usual track circuit, of a primary battery for supplying current to said track circuit, and a transformer and rectifier having an output circuit connected across said primary battery, said transformer including a magnetic shunt path the reluctance of which is responsive to the current supplied to said track circuit for automatically varying the secondary voltage of said transformer in accordance with the change in the current flowing to said track circuit, whereby the transformer and rectifier act to supply substantially all of the current required by said track circuit irrespective of variation thereof.

4. A system for supplying direct current to a variable load circuit comprising in combination with a battery, a transformer including a variable turn primary and a secondary coil and having duplicate parallel core portions forming a shunt for the magnetic circuit coupling the primary and secondary coils, a rectifier for rectifying the current supplied by said secondary winding to said battery, and coils on said core portions included in the load circuit and acting to vary the permeability of said shunt and thereby increase the secondary voltage as the load current increases, said coils being so wound and connected that opposing voltages are induced in said coils by the alternating flux in said core portions.

5. In a power supply system for track circuits on railroads, a transformer having primary and secondary coils, a full wave rectifier connected to said secondary coil for supplying double-wave rectified current to the track circuit, a primary battery for also supplying current to said track circuit, and a variable reluctance shunt magnetic path associated with the magnetic circuit coupling said primary and said secondary coils for automatically increasing the secondary voltage as the current supplied to the track circuit increases.

6. In a power supply system for track circuits on railroads, a transformer having primary and secondary coils, said transformer having a core portion constituting a shunt for the magnetic circuit coupling said primary and said secondary coils, a rectifier connected to said secondary coil and supplying current to the track circuit, a battery for supplying direct current to said track circuit, and means associated with said core portion and responsive to variations in the current supplied to the track circuit for automatically increasing the secondary voltage as the sum of the currents supplied by said rectifier and battery to the track circuit increases.

7. In a signalling system for railroads, the combination with a track circuit, of a primary battery for supplying current to said track circuit, and a transformer and rectifier having an output circuit connected across said battery, said transformer including a shunt magnetic path having reluctance responsive to the current supplied to said track circuit for automatically varying the secondary voltage of said transformer in accordance with the change in the current flowing to said track circuit, said means being so adjusted that the transformer and rectifier act to supply substantially all of the current required by said track circuit irrespective of variation thereof.

8. A system for supplying direct current to a variable load circuit comprising in combination with a primary battery, a transformer including a primary and secondary coil and having duplicate parallel core portions forming a shunt for the magnetic circuit coupling the primary and secondary coils, a rectifier for rectifying the current supplied by said secondary winding to said battery, and coils on said core portions included in series in the load circuit and acting to vary the permeability of said shunt and thereby increase the secondary voltage as the load current increases, said coils being so wound and connected that such voltages as are induced therein by the alternating flux in said core portions are equal and oppose each other.

9. In a power supply system for track circuits on railroads, a transformer having primary and secondary coils, a full wave rectifier connected to said secondary coil for supplying double-wave rectified current to the track circuit, a primary battery for also supplying current to said track circuit, and a magnetic bridge of variable reluctance associated with the magnetic circuit coupling said primary and said secondary coils for automatically increasing the secondary voltage as the current supplied to the track circuit increases.

10. In a power supply system for track circuits on railroads, a transformer having primary and secondary coils, said transformer having a core portion constituting a shunt for the magnetic circuit coupling said primary and said secondary coils, a rectifier connected to said secondary coil and supplying current to the track circuit, a primary battery for supplying direct current to said track circuit, and means associated with said core portion and responsive to variations in the current supplied to the track circuit for automatically increasing the secondary voltage as the sum of the currents supplied by said rectifier and battery to the track circuit increases.

11. In a signalling system for railroads, the combination with a track circuit, of a primary battery for supplying current to said track circuit, a transformer and rectifier having an output circuit connected across said battery, said transformer including means responsive to the current supplied to said track circuit for automatically varying the secondary voltage of said transformer in accordance with the change in the current flowing to said track circuit, said means being so adjusted that the transformer and rectifier act to supply substantially all of the current required by said track circuit irrespective of variation thereof, and other means for preventing said means inducing alternating current in said track circuit.

12. A system for supplying direct current to a variable load circuit comprising in combination with a primary battery, a transformer including the usual primary and secondary coil and having duplicate parallel core portions forming a shunt for the magnetic circuit coupling the primary and secondary coils, a rectifier for rectifying the current supplied by said secondary winding to said battery, coils on said duplicate parallel core portions connected in series to substantially equally divide the alternating fluxes in said duplicate parallel core portions, and other coils on said core portions included in series in the load circuit and acting to vary the permeability of said shunt and thereby increase the secondary voltage as the load current increases, said other coils being so wound and connected that such voltages as are induced therein by the alternating flux in said core portion are equal and oppose each other.

13. A system for supplying direct current to a variable load circuit comprising in combination with a battery, a transformer including a primary and a secondary coil and having duplicate parallel core portions forming a shunt for the magnetic circuit coupling the primary and secondary coils, a rectifier for rectifying the current supplied by said secondary winding to said battery, coils on said core portions included in series in the load circuit and acting to vary the permeability of said shunt and thereby increase the secondary voltage as the load current increases, said coils being so wound and connected that such voltages as are induced therein by the alternating flux in said core portions are equal and oppose each other, and other means associated with said duplicate parallel core portions for substantially equally dividing the alternating current flux passing through said shunt.

WADE H. REICHARD.

DISCLAIMER 1,995,652.—*Wade H. Reichard*, Rochester, N. Y. POWER SUPPLY SYSTEM. Patent dated March 26, 1935. Disclaimer filed October 10, 1936, by the assignee, *General Railway Signal Company*.

Hereby enters this disclaimer to claims 1, 2, and 6 of said Letters Patent.

[*Official Gazette November 3, 1936.*]